J. E. HILL.
VALVE.
APPLICATION FILED MAR. 5, 1909.
955,158.  Patented Apr. 19, 1910.
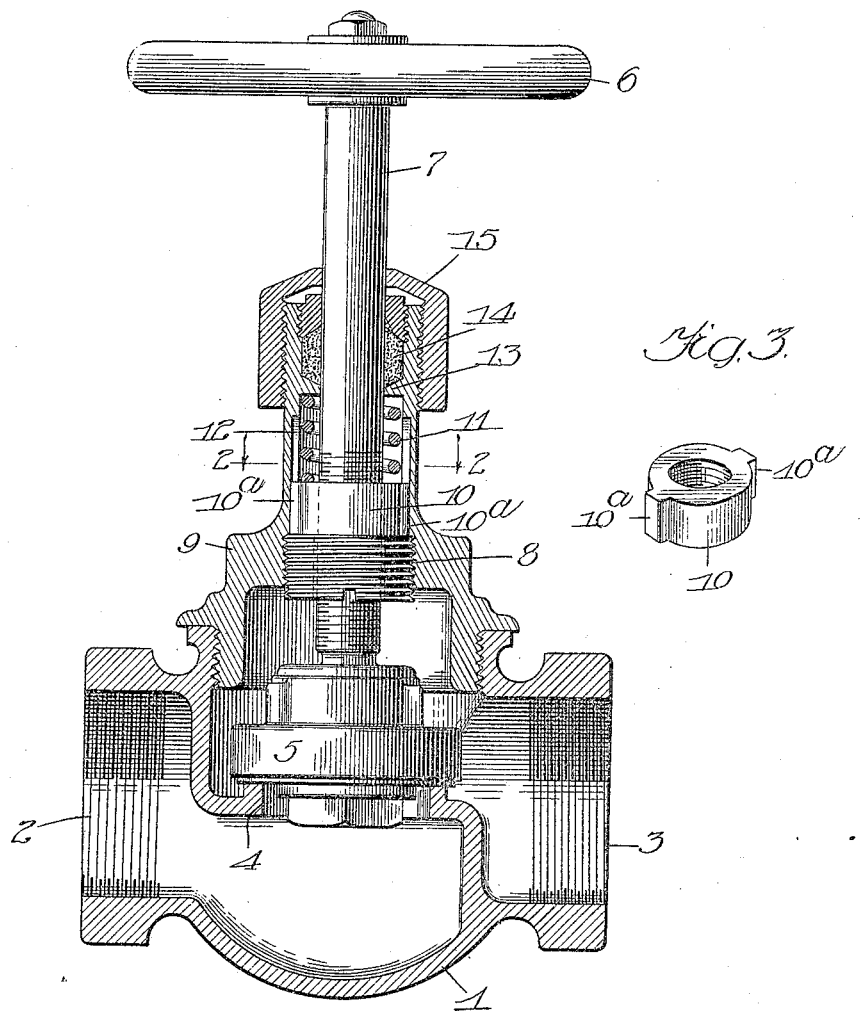
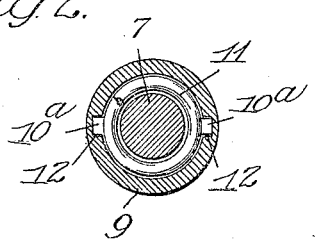
Witnesses:
Robert H. Weir
Harold G. Barrett
Inventor:
Joseph E. Hill
By Rector, Hibben & Davis
his Att'ys.

UNITED STATES PATENT OFFICE.

JOSEPH E. HILL, OF MENASHA, WISCONSIN, ASSIGNOR, BY DIRECT AND MESNE ASSIGNMENTS, TO HILL PUMP VALVE COMPANY, OF CHICAGO, ILLINOIS, A CORPORATION OF ILLINOIS.

VALVE.

955,158. Specification of Letters Patent. Patented Apr. 19, 1910.

Application filed March 5, 1909. Serial No. 481,461.

*To all whom it may concern:*

Be it known that I, JOSEPH E. HILL, a citizen of the United States, residing at Menasha, in the county of Winnebago and State of Wisconsin, have invented certain new and useful Improvements in Valves, of which the following is a specification.

My invention relates to valves and the object thereof is to provide novel and efficient means for preventing the possibility of the exertion of excess pressure upon the valve seat in screwing down the valve to closed position, thereby preventing injury to the valve seat and valve body and also preventing breakage of the parts including the valve casing. In practice it frequently occurs that an operator or engineer exerts much more strength in screwing a valve upon its seat than is necessary with the result that the valve seat and valve proper as well as the entire valve structure are frequently injured and broken.

Speaking in general terms I provide means whereby after the valve is sufficiently seated the additional or excess strength or pressure is exerted upon a resilient device such as a spring which becomes compressed after the valve has been so seated with the result that the excess pressure and strain is against a spring and not against the valve seat or other parts liable to become injured or broken.

In the drawing Figure 1 is a central sectional elevation of a valve in which my invention has been embodied; Fig. 2 a section on the line 2—2 of Fig. 1; and Fig. 3 a perspective of the movable sleeve or block coöperating with the valve stem and with the spring.

Before describing the present embodiment of my invention as illustrated herein I wish it understood that the same may be incorporated into different forms and constructions of valves, the present form of valve which is of the Jenkins type being selected for a clear and definite understanding of such invention.

Referring to the valve structure as herein shown the valve device comprises the usual casing 1 with the fluid connections 2 and 3, the valve seat 4 together with the valve proper 5 adapted to coöperate with said seat and operated by means of a hand wheel 6 through the medium of the valve stem 7. The valve body 5 is here loosely carried or swiveled upon the lower or inner end of the valve stem so that after being seated such valve body may remain stationary while the valve stem may continue to rotate. The valve stem which is screw-threaded toward its lower end passes through a central bore in a screw plug 8, the same passing freely therethrough, that is to say the threads on the valve stem do not engage with such plug. This screw plug 8 is screw-threaded into the lower portion of the central bore of the valve bonnet 9 which is secured to the valve casing 1 in the usual and well-known manner as shown in Fig. 1. The screw threads of the valve stem, however, engage with a movable block or sleeve 10 which is capable of a longitudinal movement in the central portion of the bore of the bonnet and against the tension of a coiled spring 11 which bears upon the upper end of such block and tends to resist the upward movement thereof when the valve stem is screwed downwardly in the operation of seating the valve and after the valve has been seated as hereinafter explained. In order to prevent rotation of this block and to compel such longitudinal movement I provide the same at each side with a vertical rib or flange $10^a$ arranged to travel in a guide way 12 in the bore of the valve bonnet. The coiled spring is confined within the bore of the bonnet, abutting at its lower end against the block 10 as described and at its upper end against any fixed or stationary portion of the bonnet, in the present instance against the portion 13 as shown in Fig. 1. The valve stem is provided with the usual stuffing box 14 and with the clamping nut 15.

Describing the operation of my improved valve, when the handle 6 is turned in the direction to screw the valve stem inwardly such valve stem moves freely in the block 10 and the valve body 5 advances to its seat and after being properly seated the further or continued rotation of the valve stem acts upon the block 10 and causes the latter to move upwardly against the tension of the spring 11 which may be made of any desired tension and which is usually of considerable tension in order that the strength or strain exerted by the operator or engineer may be sufficiently counteracted before the spring has been compressed to its limit. Thus after the valve proper has been seated and has thereby prevented further inward movement of the valve stem, the force or pressure exerted by the operator in his continued rotation of the valve stem is not imparted to the valve and its seat but is exerted against the tension of the spring. As a result the valve seat and valve proper and indeed all the parts of the valve are relieved from strain and possibility of breakage. These results I accomplish in a device which is extremely simple of construction and incorporation in valves without materially modifying their structure and which moreover is very efficient in practice to overcome the objects hereinbefore noted.

I claim:

1. In a valve, the combination, with the valve proper, and its seat and operating stem, of means for preventing the exerting of undue pressure of the valve upon the seat comprising a spring and a block moved against the spring by the operation of the valve stem after the seating of the valve the spring receiving the entire pressure.

2. In a valve, the combination, with the valve proper, and its seat and operating stem, of means for preventing the exerting of undue pressure of the valve upon the seat comprising a spring, and a block into which the stem screws and which is movable longitudinally thereof against the spring by the operation of the stem after the seating of the valve the spring receiving the entire pressure.

3. In a valve, the combination, with the valve proper, and its seat and operating stem, of means for preventing the exerting of undue pressure of the valve upon the seat comprising a spring, and a block into which the stem screws and which is movable longitudinally thereof against the spring by the operation of the stem after the seating of the valve, said block having means preventing its rotation but permitting said longitudinal movement.

4. In a valve, the combination, with the valve proper, and its seat and operating stem, of means for preventing the exerting of undue pressure of the valve upon the seat comprising a spring, and a block into which the stem screws and which is movable longitudinally thereof against the spring by the operation of the stem after the seating of the valve, said block having a side flange adapted to coöperate with the valve structure to prevent rotation of such block.

5. In a valve, the combination with the valve casing and its bonnet and with the valve proper and its seat and operating stem, of a block which is located within the valve bonnet and into which the stem is screw threaded, and a spring located within the bonnet and adapted to bear against the block said spring receiving the entire pressure after the seating of the valve.

6. In a valve, the combination, with the valve proper, and its seat and operating stem, of means for preventing the exerting of undue pressure of the valve upon the seat comprising a spring, and a block into which the stem screws and which is movable longitudinally thereof against the spring by the operation of the stem after the seating of the valve, said block having a side flange and the bonnet having a guide slot or way to receive the flange thereby preventing rotation of the block but permitting longitudinal movement thereof against the tension of the spring.

7. In a valve, the combination with the valve casing and its bonnet and with the valve proper and its seat and operating stem, of a block which is located within the valve bonnet and into which the stem is screw threaded, a screw plug 8 in the valve bonnet through which the valve stem freely passes, and a spring located within the bonnet and adapted to bear against the block.

8. In a valve, the combination with the valve casing and its bonnet and with the valve proper and its seat and operating stem, of a block which is located within the valve bonnet and into which the stem is screw threaded, and a spring located within the bonnet and adapted to bear against the block, said valve proper being swiveled upon the valve stem and the spring receiving the entire pressure after the seating of the valve.

JOSEPH E. HILL.

Witnesses:
JOHN McC. PLEASANTS,
OTTO J. WELSCH.